US012613175B2

(12) United States Patent
Rüegg et al.

(10) Patent No.: US 12,613,175 B2
(45) Date of Patent: Apr. 28, 2026

(54) METHOD AND DEVICE FOR DETERMINING A FLOW RATE

(71) Applicant: Sensirion AG, Stäfa (CH)

(72) Inventors: Andreas Rüegg, Männedorf (CH); Nicolas Moeller, Stäfa (CH)

(73) Assignee: Sensirion AG, Stäfa (CH)

( * ) Notice: Subject to any disclaimer, the term of this patent is extended or adjusted under 35 U.S.C. 154(b) by 440 days.

(21) Appl. No.: 18/297,331

(22) Filed: Apr. 7, 2023

(65) Prior Publication Data

US 2023/0324270 A1     Oct. 12, 2023

(30) Foreign Application Priority Data

Apr. 8, 2022     (EP) ..................................... 22167433

(51) Int. Cl.
*G01N 11/04* (2006.01)
*G01F 1/84* (2006.01)

(52) U.S. Cl.
CPC .............. *G01N 11/04* (2013.01); *G01F 1/84* (2013.01)

(58) Field of Classification Search
CPC .................................. G01N 11/04; G01F 1/84
USPC ......................................................... 73/54.02
See application file for complete search history.

(56) References Cited

U.S. PATENT DOCUMENTS 4,641,535 A * 2/1987 Malguarnera ............. G01F 1/40
                                                    73/32 R
5,237,523 A * 8/1993 Bonne ...................... G01F 15/04
                                                    702/100

5,546,813 A * 8/1996 Hastings ................. G01P 5/245
                                                    73/861.29
5,576,487 A  11/1996 Gimson
6,513,393 B1  2/2003 Eckert et al.
2003/0146758 A1  8/2003 Koike et al.
2005/0022611 A1  2/2005 Hemp et al.
2008/0000283 A1  1/2008 Wang et al.
2011/0257898 A1  10/2011 Ooishi
(Continued)

FOREIGN PATENT DOCUMENTS

JP     2013-113755 A     6/2013
WO     WO-01/98736 A1     12/2001

OTHER PUBLICATIONS

Extended European Search Report issued in EP Application No. 22167433.6, mailed Sep. 30, 2022, 10 pages.
(Continued)

*Primary Examiner* — Peter J Macchiarolo
*Assistant Examiner* — Rodney T Frank
(74) *Attorney, Agent, or Firm* — Foley & Lardner LLP

(57) ABSTRACT

In a method of determining a flow rate of a flow of a fluid of interest in a fluidic system, a raw flow rate signal ($Q_{sensor}$) is determined using a flow rate sensor. The raw flow rate signal is corrected using a flow rate correction function ($\Delta$) to obtain a corrected flow rate signal ($Q_{sensor,corr}$). The flow rate correction compensates for a flow rate signal error that is caused by integration of the flow rate sensor into the fluidic system. It is based on a reference correction function ($\delta$) that is indicative of a flow rate signal error for a flow of a reference fluid due to the integration of the flow rate sensor into the fluidic system.

18 Claims, 6 Drawing Sheets

(56) References Cited

U.S. PATENT DOCUMENTS

| | | | |
|---|---|---|---|
| 2014/0200836 A1* | 7/2014 | Lee | G01F 1/66 |
| | | | 702/47 |
| 2016/0131511 A1 | 5/2016 | Shirai et al. | |
| 2016/0245681 A1* | 8/2016 | Maginnis | G01F 15/046 |
| 2021/0116283 A1 | 4/2021 | Yamamoto | |
| 2021/0303007 A1 | 9/2021 | Nguyen et al. | |

OTHER PUBLICATIONS

J.H. Spurk and N. Aksel, "Fluid Mechanics", Springer Verlag, 2008, second edition, 534 pages.—translation of J.H. Spurk and N. Aksel, «Strömungslehre».

Najafi et al., "Coriolis MEMS-sensing technology for real-time fluidic measurements", Flow Control, pp. 16-19, May 2017.

Office Action issued in corresponding EP Patent Application No. 22167433.6, dated Sep. 2, 2025 (6 pages).

Kumar et al., "Validation of installation effects of an ultrasonic flow meter on butterfly valve using numerical analysis", Materials Today: Proceedings, vol. 46, Jan. 1, 2021 (Jan. 1, 2021), pp. 6692-6699, XP093298796, NL ISSN: 2214-7853, DOI: 10.1016/j.matpr.2021.04.164.

* cited by examiner

Determine and store $\delta$ — 201

Determine and store $r_{FA}$ — 202

Determine and store $r_j(T)$ — 203

Measure $Q_{sensor}$ — 211

Obtain $r_j(T)$ — 212

Compute
$$\Delta(Q_{sensor}, r_j(T)) = \frac{r_{FA}}{r_j(T)} \delta \left( \frac{r_j(T)}{r_{FA}} Q_{sensor} \right)$$
— 213

Compute
$$Q_{sensor,corr} = Q_{sensor} + \Delta(Q_{sensor}, r_j(T))$$
— 214

Output $Q_{sensor,corr}$ — 215

METHOD AND DEVICE FOR DETERMINING A FLOW RATE

CROSS REFERENCE TO RELATED APPLICATIONS

This application claims priority to European Appl. No. 22167433.6, filed Apr. 8, 2022, the contents of which are incorporated by reference herein in their entirety.

TECHNICAL FIELD

The present invention relates to a method for determining a flow rate of a flow of a fluid of interest in a fluidic system and to a corresponding flow measurement device.

BACKGROUND OF THE INVENTION

Static flow meters for gases or liquids, i.e. flow meters without moving mechanical parts, such as thermal mass flow meters or ultrasonic flow meters, are normally factory-calibrated under well-defined flow conditions. However, it has turned out that the output of such flow meters can become inaccurate once the flow meter has been integrated into a fluidic system. This deterioration of accuracy may be due to a change of flow conditions at the inlet and/or outlet of the flow meter caused by integration into the fluidic system. In contrast to some types of mechanical flow meters, such as diaphragm flow meters or rotary flow meters, static flow meters often do not interact with the entire flow through a flow channel. Instead, they often interact only with a portion of the total lateral flow profile in the flow channel. The portion of the flow profile that is "seen" by the flow meter may change when the flow meter is integrated into a fluidic system. Even if the flow profile with which the flow meter interacts is unaffected by the integration, the reading of the flow meter may still be affected. For instance, sometimes a flow meter is arranged in a bypass channel that bypasses a flow restrictor in a mainpass channel. In this case, the division ratio between the mainpass and bypass flows may be affected by the integration of the mainpass channel into the fluidic system.

SUMMARY OF THE INVENTION

In a first aspect, it is an object of the present invention to provide a method of determining a flow rate of a flow of a fluid of interest in a fluidic system using a flow rate sensor, the method reducing inaccuracies due to integration of the flow rate sensor into the fluidic system.

A method of determining a flow rate of a flow of a fluid of interest in a fluidic system is provided, the method comprising the steps of:

determining a raw flow rate signal for the flow of the fluid of interest in the fluidic system, using a flow rate sensor that is integrated into the fluidic system;

correcting the raw flow rate signal using a flow rate correction function to obtain a corrected flow rate signal, the flow rate correction function correcting for a flow rate signal error that is caused by integration of the flow rate sensor into the fluidic system, the flow rate correction function being based on a reference correction function that is indicative of a flow rate signal error for a flow of a reference fluid due to said integration; and outputting the corrected flow rate signal.

By correcting the raw flow rate signal using a flow rate correction function, the error that is caused by the changed flow conditions when the flow rate sensor is integrated into the flow system can be at least partially corrected. The flow rate correction function is based on a reference correction function that has been determined for a reference fluid. The reference correction function needs to be determined only once by a reference measurement.

In the simplest case, the flow rate correction function of the proposed method may be simply identical with the reference correction function, independently of the composition of the fluid of interest and independently of the operating conditions of the sensor, in particular, independently of the temperature of the fluid of interest. This may work reasonably well for fluids of interest that have a similar composition as the reference fluid if flow rates are measured at similar temperatures as during the reference measurement for determining the reference correction function. For instance, the reference measurement may be carried out using air at room temperature as a reference fluid. The correction is then expected to be reasonably good for fluids of interest that are reasonably similar to air, e.g., for air that has been enriched with oxygen, if flow rate measurements are carried out near room temperature.

However, in some cases, the fluid of interest may have an entirely different composition than the reference fluid. For instance, the reference fluid may be air, while the fluid of interest may be a binary mixture of oxygen with helium ("heliox") or a binary mixture of methane and hydrogen. Due to the different flow characteristics of the fluid of interest and the reference fluid, the flow profiles that are "seen" by the flow sensor for the fluid of interest and for the reference fluid may be considerably different. A "one fits all" approach that uses the same flow rate correction function for all fluids of interest, independently of fluid composition, may therefore not work very well.

To improve correction, it is possible to determine a plurality of separate reference correction functions for a plurality of reference fluids having different compositions. When measurements on a given fluid of interest are carried out, the user may select a reference correction function that is associated with a reference fluid that has similar composition as the fluid of interest. However, determining a plurality of reference correction functions requires considerable time and resources.

In order to obviate the need to record a large number of reference correction functions, the actual flow rate correction function may be derived from the reference correction function in a manner that takes the difference between the flow characteristics of the fluid of interest and the reference fluid into account. It has been found that the most relevant physical quantity that affects the flow profile is the kinematic viscosity $$v = \frac{\eta}{\rho}, \tag{1}$$

where $\eta$ is the dynamic viscosity and $\rho$ the density of the fluid. In advantageous embodiments, the proposed method accounts for the difference between the kinematic viscosities of the fluid of interest and of the reference fluid. Specifically, the step of correcting the raw flow rate signal may comprise:

applying a rescaling operation to the raw flow rate signal, using a flow rate rescaling factor that reflects a deviation of the kinematic viscosity of the fluid of interest from the kinematic viscosity of the reference fluid, to obtain a rescaled flow rate signal, preferably by multiplying the flow rate rescaling factor with the raw flow rate signal;

evaluating the reference correction function for the rescaled flow rate signal;

applying an inverse rescaling operation to the result of said evaluation to obtain a value of the flow rate correction function, preferably by multiplying the result of the evaluation with the inverse rescaling factor; and correcting the raw flow rate signal using the thus-obtained value of the flow rate correction function, preferably by adding or subtracting the value of the flow rate correction function to/from the raw flow rate signal.

In this manner, good correction can be achieved over a wide range of fluids of interest, based on only a single reference correction function that has been obtained by a reference measurement with a single reference fluid.

The flow rate rescaling factor may reflect not only a deviation of the kinematic viscosity of the fluid of interest from the kinematic viscosity of the reference fluid that is due to a different composition of the fluid of interest, but it may also reflect a difference between the operating conditions under which the flow measurement for the fluid of interest takes place and the reference conditions under which the reference measurements with the reference fluid were carried out. In particular, the flow rate rescaling factor may reflect a difference between the temperatures and/or pressures of the fluid of interest during actual sensor operation and the reference fluid during the reference measurement. The flow rate rescaling factor may thus depend on the temperature and/or pressure of the fluid of interest. The method may then comprise measuring the temperature and/or pressure of the fluid of interest and determining the flow rate rescaling factor, taking the measured temperature and/or pressure of the fluid of interest into account.

It should be noted that the flow rate rescaling factor depends only on physical properties of the fluid of interest, such as its viscosity and density, and is independent of the geometry of the fluidic system and the device characteristics of the flow sensor. If the composition of the fluid of interest is known, the flow rate rescaling factor may readily be calculated based on known physical properties of the fluid of interest. Properties like viscosity and density or physical parameters that permit calculation of these properties are available in tabulated form for a large number of fluids with a wide range of compositions.

In the alternative, the fluid-specific flow rate rescaling factor may be determined through measurements. This may be particularly advantageous if the composition of the fluid of interest is unknown. In particular, a quantity that correlates with the kinematic viscosity of the fluid of interest may be measured using an auxiliary sensor. The flow rate rescaling factor may then be determined based on the measured quantity.

In some embodiments, the measured quantity may be directly indicative of the kinematic viscosity of the fluid of interest. In particular, the auxiliary sensor may be a Coriolis flow meter, whose output for a given flow rate is directly indicative of the kinematic viscosity of the fluid whose flow is being measured.

In other embodiments, the measured quantity may not be directly indicative of the kinematic viscosity of the fluid of interest. For instance, the measured quantity may be indicative of thermal conductivity, thermal diffusivity or speed of sound of the fluid of interest. The fluid-specific rescaling factor may then be determined based on the measured quantity using a correlation function.

The method may further comprise a calibration measurement for determining the reference correction function. The calibration measurement may comprise:

measuring raw flow rate signals for a flow of the reference fluid at a plurality of known flow rates; and for each of the measured raw flow rate signals, determining a difference of the associated known flow rate and the measured raw flow rate signal to obtain a value of the reference correction function at said raw flow rate signal.

In some embodiments, the calibration measurement may be carried out using the actual flow rate sensor after integration into the fluidic system. In other embodiments, the calibration measurement may be carried out on a reference flow rate sensor in a reference fluidic system, and the thus-determined reference correction function may be used for a plurality of flow rate sensors of the same type that are integrated into fluidic systems with the same or similar flow geometries.

During the calibration measurement, the reference fluid may have reference conditions (reference temperature and/or reference pressure) that are different from predetermined standard conditions (standard temperature and/or standard pressure). The method may then comprise determining a reference rescaling factor that reflects a deviation of the kinematic viscosity of the reference fluid at the reference conditions from the kinematic viscosity of the reference fluid at the standard conditions, and the flow rate rescaling factor may be calculated as a ratio of a standard-related rescaling factor and the reference rescaling factor, the standard-related rescaling factor reflecting a deviation of the kinematic viscosity of the fluid of interest from the kinematic viscosity of the reference fluid at the standard conditions.

In another aspect, the present invention provides a flow measurement device for determining a flow rate of a flow of a fluid of interest in a fluidic system, the flow measurement device being specifically configured to carry out the method of the present invention. The flow measurement device comprises:

a flow rate sensor that is integrated into the fluidic system, the flow rate sensor being configured to determine a raw flow rate signal for the flow of the fluid of interest in the fluidic system; and electronic circuitry configured to carry out the steps of:

correcting the raw flow rate signal using a flow rate correction function to obtain a corrected flow rate signal, the flow rate correction function correcting for a flow rate signal error that is caused by integration of the flow rate sensor into the fluidic system, the flow rate correction function being based on a reference correction function that is indicative of a flow rate signal error for a flow of a reference fluid due to said integration; and outputting the corrected flow rate signal.

The reference correction function may be stored in the electronic circuitry in the form of a lookup table with discrete values of the reference correction function. Specifically, the electronic circuitry may comprise a memory device that stores a plurality of discrete values of the reference correction function, and the electronic circuitry may be configured to retrieve selected values of the reference correction function from the memory device and, optionally, to interpolate between the selected values when the electronic circuitry evaluates the flow rate correction function.

The electronic circuitry may be configured carry out the step of correcting the raw flow rate signal by:

applying a rescaling operation to the raw flow rate signal, using a flow rate rescaling factor that reflects a deviation of a kinematic viscosity of the fluid of interest from a kinematic viscosity of the reference fluid, to obtain a rescaled flow rate signal;

evaluating the reference correction function for the rescaled flow rate signal;

applying an inverse rescaling operation to the result of said evaluation to obtain a value of the flow rate correction function; and correcting the raw flow rate signal using the thus-obtained value of the flow rate correction function.

The flow measurement device may comprise a temperature sensor and/or a pressure sensor for measuring a temperature and/or pressure of the fluid of interest, and the electronic circuitry may be configured to determine the flow rate rescaling factor, taking the measured temperature and/or pressure of the fluid of interest into account.

The flow measurement device may further comprise an auxiliary sensor for measuring a quantity that correlates with the kinematic viscosity of the fluid of interest, and the electronic circuitry may be configured to base determination of the flow rate rescaling factor on the measured quantity. As explained above, the auxiliary sensor may be a Coriolis flow meter, which directly measures a quantity that is indicative of kinematic viscosity, or the auxiliary sensor may be a configured to measure thermal conductivity, thermal diffusivity or speed of sound of the fluid of interest, and the electronic circuitry may be configured to determine the flow rate rescaling factor based on the measured quantity using a correlation function.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Setup and Operation of Prior-Art Flow Rate Sensor

Figure 1:
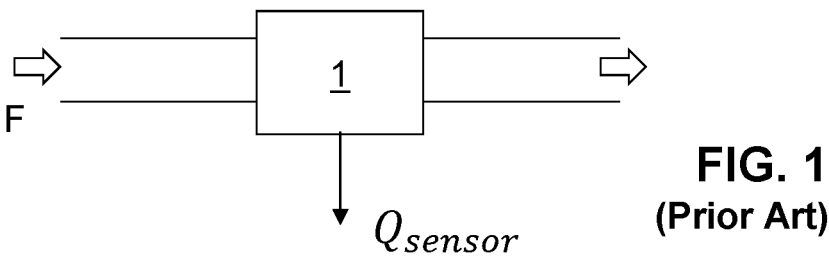
FIG. 1 shows a highly schematic functional sketch of a prior-art flow rate sensor.

FIG. 1 illustrates, in a highly schematic sketch, a functional diagram of a flow rate sensor 1 as it is known from the prior art. A flow F of a fluid (which may be a liquid or a gas) is passed through or along the flow rate sensor 1. The flow rate sensor 1 outputs a raw flow rate signal $Q_{sensor}$ sensor that is indicative of the flow rate of the fluid past the flow rate sensor 1.

Figure 2:
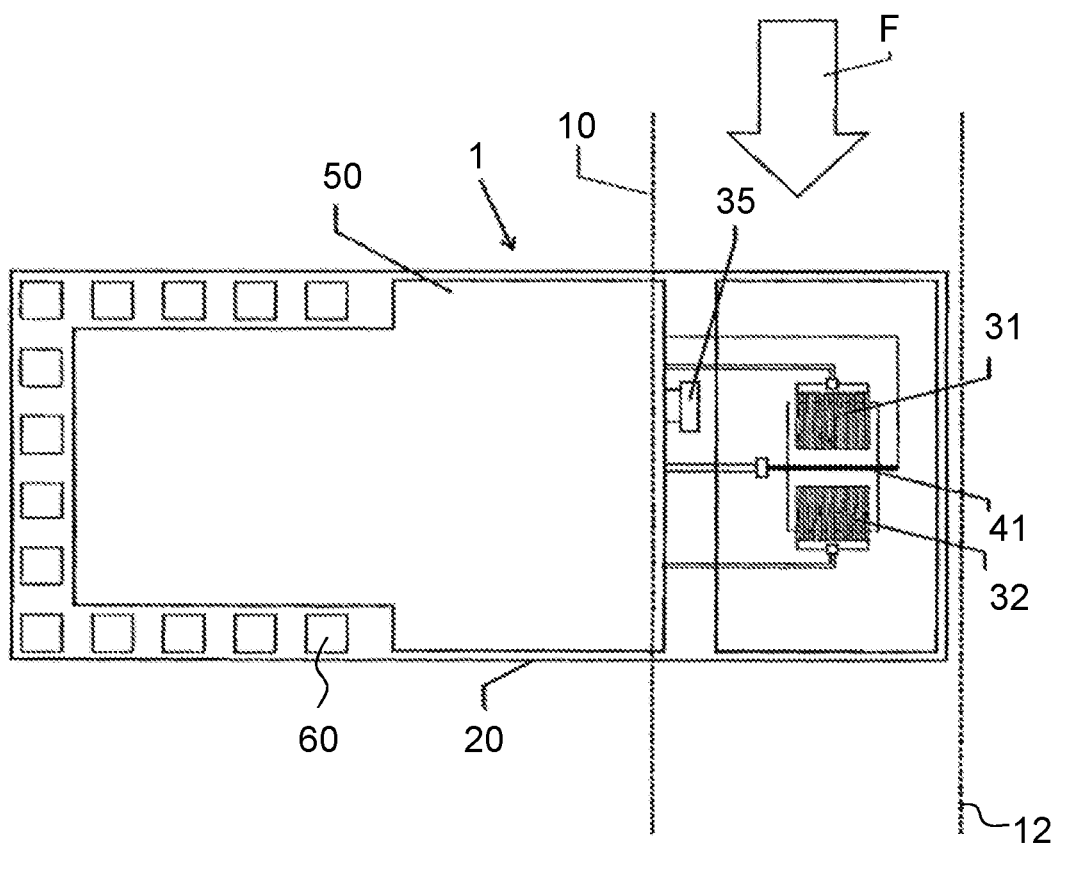
FIG. 2 shows, in a plan view, an example of a microthermal flow rate sensor as it is known in the art.

Many different types of flow rate sensors are known. One example is a microthermal flow rate sensor. In the following, the setup and operation of an exemplary microthermal flow rate sensor 1 as disclosed in WO 01/98736 A1 will be described with reference to FIG. 2. The flow rate sensor 1 is formed on a silicon substrate 20 in which an opening or recess 21 has been formed by etching. A thin membrane 22 spans the opening or recess 21. On the membrane 22, a resistive heater 41, a first (upstream) temperature sensor 31 and a second (downstream) temperature sensor 32 are arranged. The first temperature sensor 31 is arranged upstream of the heater 41 with respect to the flow F, while the second temperature sensor 32 is arranged downstream of the heater 41. The flow rate sensor 1 further comprises a bulk temperature sensor 35 for determining the temperature of the bulk substrate that surrounds the membrane, which is indicative of the temperature of the fluid of interest away from the heater 41. The flow rate sensor 1 further comprises integrated processing circuitry 50, which comprises both analog and digital components for carrying out various tasks, including controlling the heater 41, reading out the temperature sensors 31, 32 and 35, and calculating a raw flow rate signal based on the signals of the temperature sensors. Contact pads 60 are provided for interfacing the flow rate sensor 1 with external circuitry.

For determining a mass flow rate of a fluid flowing through a flow channel 10, the heater 41 and the temperature sensors 31, 32 and 35 are exposed to the fluid, and the flow rate sensor 1 is operated as follows: The heater 41 is supplied with a heater power. While the heater is activated, the upstream and downstream temperature sensors 31, 32 are read out to determine an upstream temperature and a downstream temperature, and the difference of the upstream and downstream temperatures is calculated. In an alternative, the upstream and downstream temperature sensors are connected in an anti-series configuration, such that the resulting thermoelectric voltage is directly indicative of the difference of the upstream and downstream temperatures. From the measured temperature difference, a raw flow rate signal $Q_{sensor}$ is calculated. To this end, calibration data are used. These calibration data are stored as a lookup table in a memory of the processing circuitry 50, the lookup table comprising a plurality of data pairs, each data pair relating a temperature difference to an associated mass flow rate. For a particular measured temperature difference, a raw flow rate signal $Q_{sensor}$ is determined by interpolating between the closest data pairs in the lookup table.

Instead of outputting a raw flow rate signal $Q_{sensor}$ that is indicative of mass flow, the processing circuitry may output a raw flow signal $Q_{sensor}$ that is indicative of some other flow-related quantity, e.g., standard volume flow. To this end, the absolute temperature measured by the bulk temperature sensor 35 and optionally a pressure value that is indicative of the pressure of the fluid may be taken into account. All this is well-known in the art and does not need any detailed explanation.

If the flow rate sensor is intended to be used with a plurality of fluids of interest having different compositions, the memory may store a plurality of separate lookup tables, one lookup table for each fluid of interest, and the user may select the appropriate lookup table to be used. In this manner, the sensor may be able to output a raw flow rate signal $Q_{sensor}$ for each of the fluids of interest ("multi-fluid calibration").

The above description has only been provided by the way of example. For the following discussion it is only important that the raw flow rate signal $Q_{sensor}$ accurately reflects the actual flow rate of the fluid flow F for a desired fluid of interest as long as the flow conditions through the flow rate sensor 1 are identical with the flow conditions at which the calibration data were determined. The exact type of flow rate sensor is not decisive.

Integration Into Fluidic System

Figure 3:
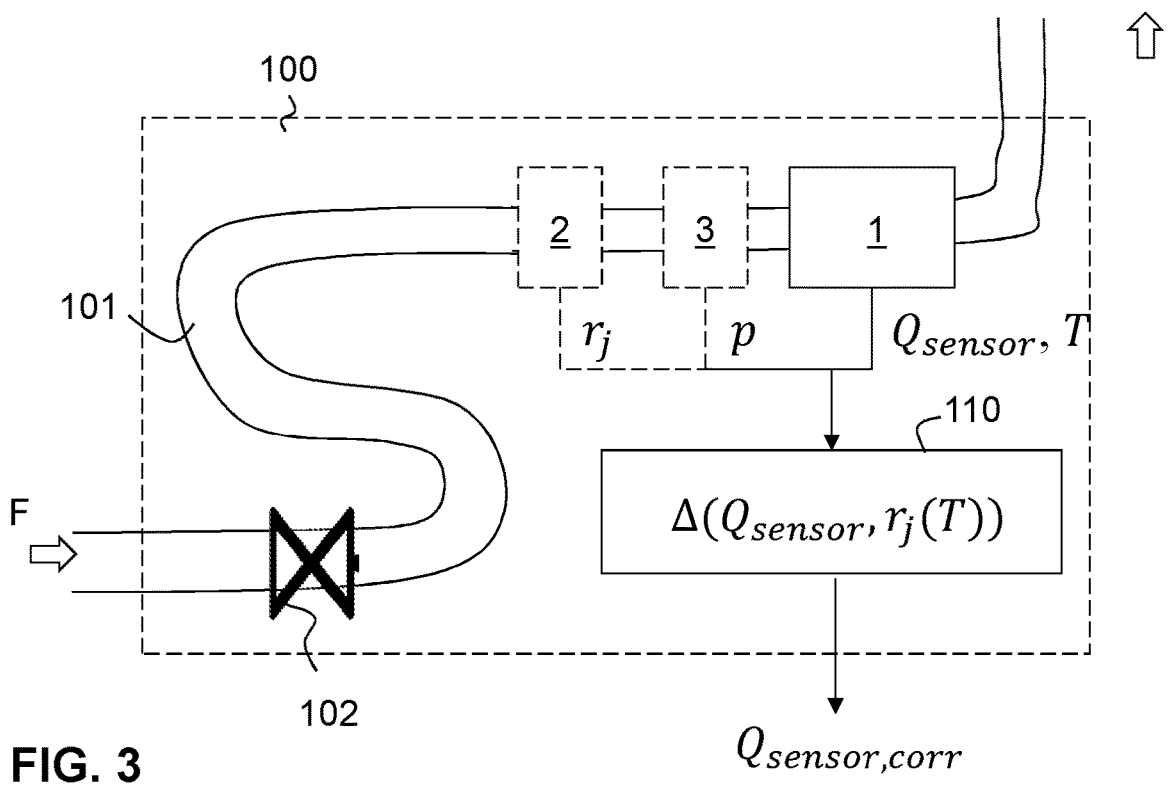
FIG. 3 shows a highly schematic functional sketch of a flow rate measurement system according to an embodiment of the present invention.

After having been factory-calibrated under controlled flow conditions, the flow rate sensor 1 may be integrated into a fluidic system. FIG. 3 schematically illustrates a simple example of a fluidic system 100 comprising curved tubing 101 and a control valve 102. A flow rate sensor 1 is integrated into the fluidic system 100, being arranged at some position along the tubing 101 downstream of the control valve 102. A flow F of a fluid of interest is passed through the fluidic system 100.

Due to the integration of the flow rate sensor 1 into the fluidic system 100, the flow conditions at the inlet and outlet of the flow rate sensor 1 are now different than they were during factory calibration. This causes the flow profile that is seen by the flow rate sensor 1 to be different. In consequence, the raw flow rate signal $Q_{sensor}$ may deviate from the true flow rate through the flow rate sensor 1 by a flow rate error.

In order to correct the raw flow rate signal for this flow rate error, the fluidic system 100 of FIG. 3 comprises electronic circuitry in the form of a correction unit 110, which applies a flow rate correction function to the raw flow rate signal. This will be explained in more detail below. As will also explained in more detail below, the fluidic system 100 may optionally comprise an auxiliary sensor 2 and/or a pressure sensor 3.

Correction Unit

Figure 4:
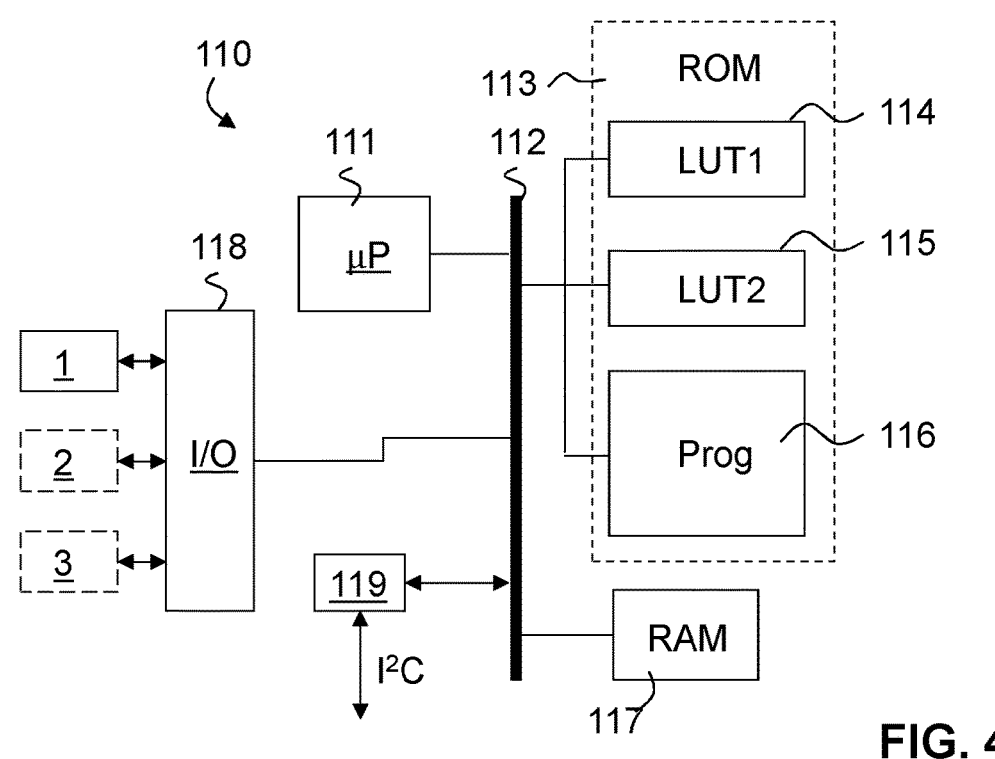
FIG. 4 shows a schematic hardware-oriented block diagram of electronic circuitry of a flow rate measurement system according to an embodiment of the present invention.

FIG. 4 illustrates a highly schematic hardware-oriented block diagram of an exemplary correction unit 110 that may be used in connection with the present invention. The correction unit 110 comprises a microprocessor (μP) 111 connected to a data bus 112. Data are exchanged via the bus with a read-only memory (ROM) 113, a random-access memory (RAM) 117, and a communication interface 119 for outputting the corrected flow rate signal, e.g., an I²C interface. The ROM 113 stores, inter alia, lookup tables LUT1, LUT2, symbolized by boxes 114, 115, and program instructions for the microprocessor 111, symbolized by a box 116. Also connected to the bus 112 is an input/output (I/O) interface 118 for interfacing the correction unit 110 with the flow rate sensor 1 and, where applicable, with the auxiliary sensor 2 and the pressure sensor 3.

Flow Rate Correction Using a Reference Correction Function

After integration of the flow rate sensor 1 into the fluidic system 100, values of a reference correction function δ may be recorded through a reference measurement, using a flow of a reference fluid at a plurality of known reference flow rates $Q_{ref}$. The reference correction function may be defined as $$\delta(Q_{sensor}) = Q_{ref} - Q_{sensor}, \tag{2}$$

where $Q_{sensor}$ is the raw flow rate signal of the flow rate sensor 1 that is obtained at the reference flow rate $Q_{ref}$.

Values of the reference correction function δ for a series of discrete values of $Q_{sensor}$ may be stored in the memory 113 of the correction unit 110 in the form of the lookup table LUT1.

During subsequent operation of the flow rate sensor 1, the correction unit 110 may apply the following correction to the raw flow rate signal $Q_{sensor}$:

$$Q_{sensor,corr} = Q_{sensor} + \delta(Q_{sensor}) \tag{3}$$

In other words, the raw flow rate signal $Q_{sensor}$ is corrected by adding a value of a flow rate correction function to the raw flow rate signal to obtain a corrected flow rate signal $Q_{sensor,corr}$. In the present example, the flow rate correction function is identical with the reference correction function δ.

Figure 5A:
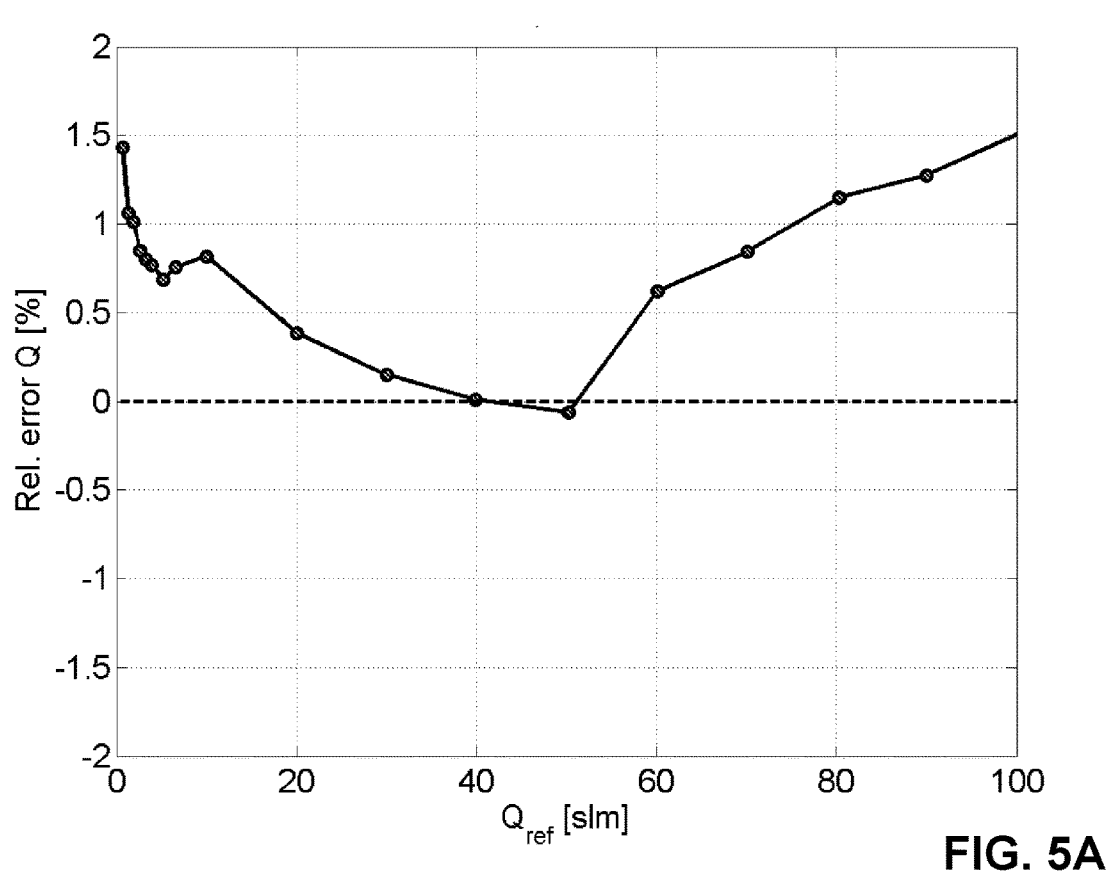
FIG. 5A shows a diagram illustrating the relative error of the raw flow rate signal of a flow rate sensor in air after integration of the sensor into a fluidic system.
Figure 5B:
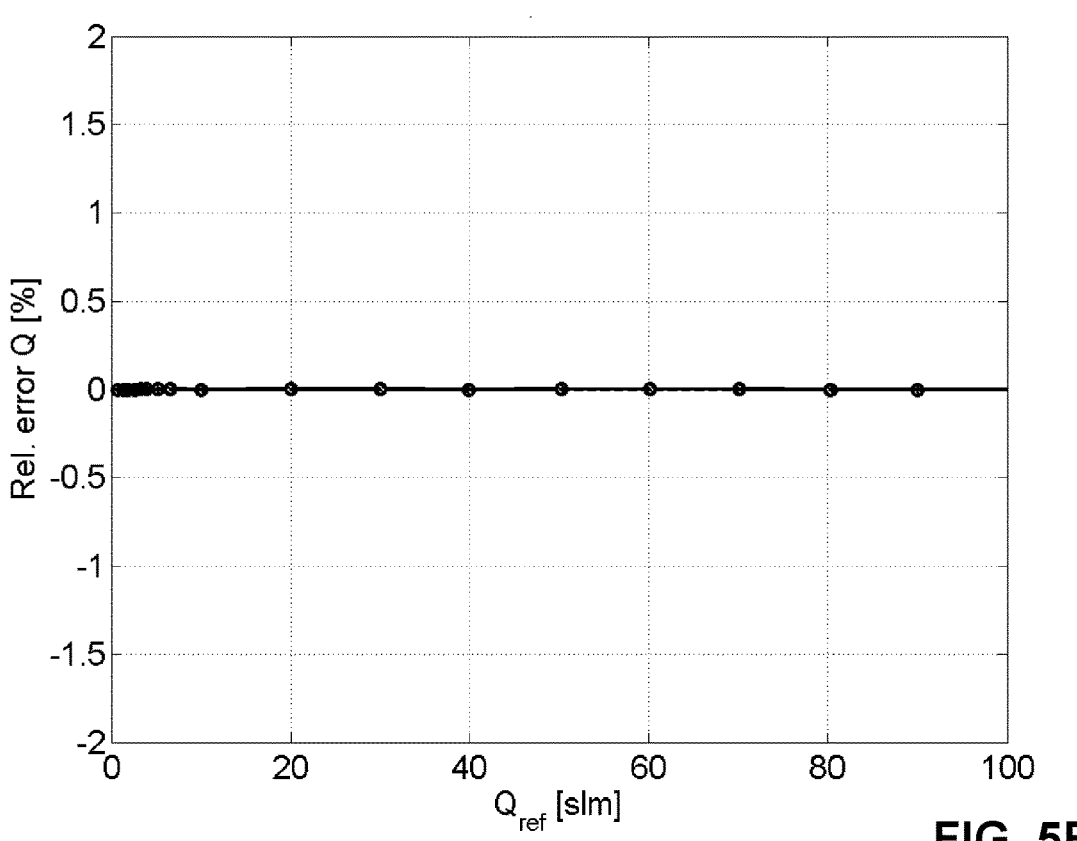
FIG. 5B shows a diagram illustrating the relative error of the corrected flow rate signal of the flow rate sensor in air, using the reference correction function of Eq. (2)

The effect of this operation is illustrated in FIGS. 5A and 5B. FIG. 5A shows the relative error of the raw flow rate signal $Q_{sensor}$ due to integration of a flow rate sensor into a fluidic system, wherein the fluid of interest whose flow rate is measured is air. FIG. 5B shows the relative error of the corrected flow rate signal $Q_{sensor,corr}$, using a reference correction function δ that has been recorded using air as the reference fluid. Nearly perfect correction of the flow rate error is achieved.

Flow Rate Correction Using a Generalized Flow Rate Correction Procedure

Unfortunately, the reference correction function Eq. (2) delivers such excellent results only if the fluid of interest that is used for the actual measurement is the same as the reference fluid with which the reference correction function was recorded during the reference measurement, and if the temperature of the fluid of interest during operation of the flow rate sensor is close to the temperature of the reference fluid during the reference measurement. However, in many applications, the same flow rate sensor must be capable of measuring flow rates in a variety of fluids of interest, which may have widely differing compositions, and at different temperatures and pressures. Directly applying the reference correction function of Eq. (1) to the raw flow rate signals, as it is done in Eq. (3), may then result in relatively large errors.

Figure 6A:
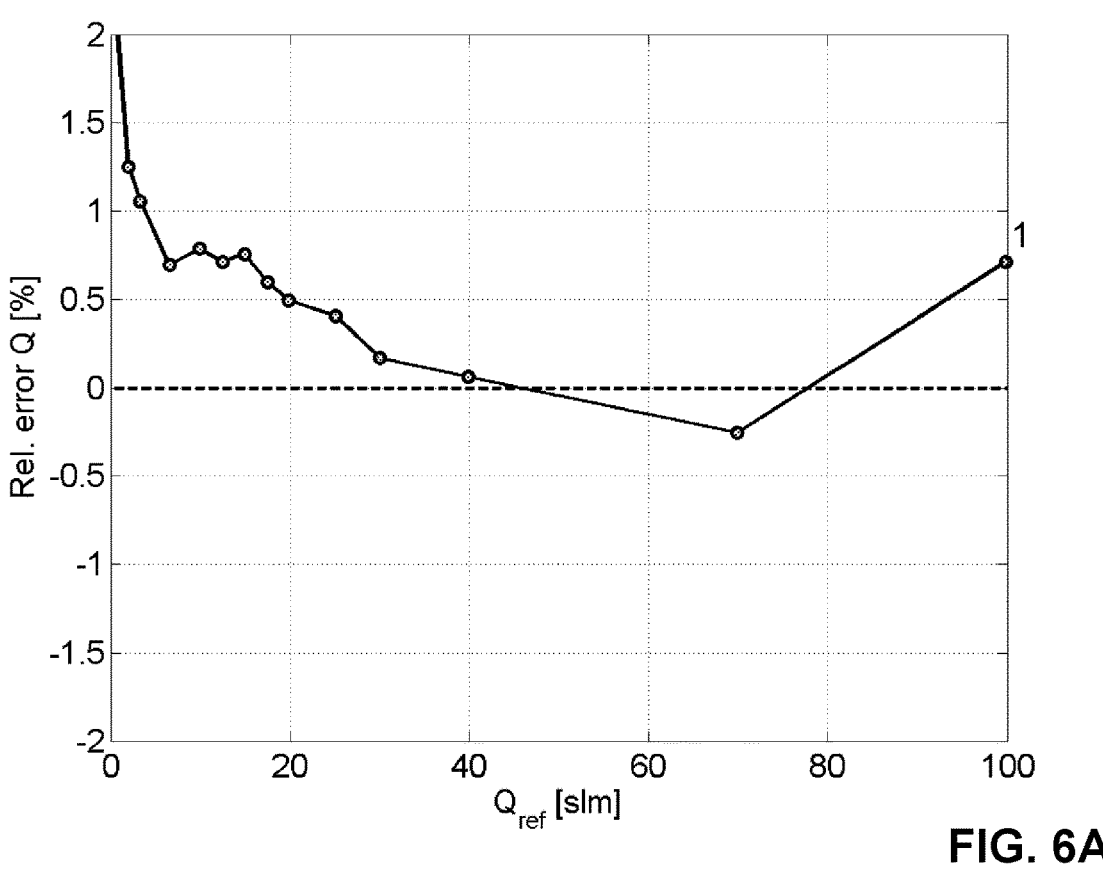
FIG. 6A shows a diagram illustrating the relative error of the raw flow rate signal of the same flow rate sensor, but now measured in a mixture of 77% $CH_4$ and 23% $H_2$.
Figure 6B:
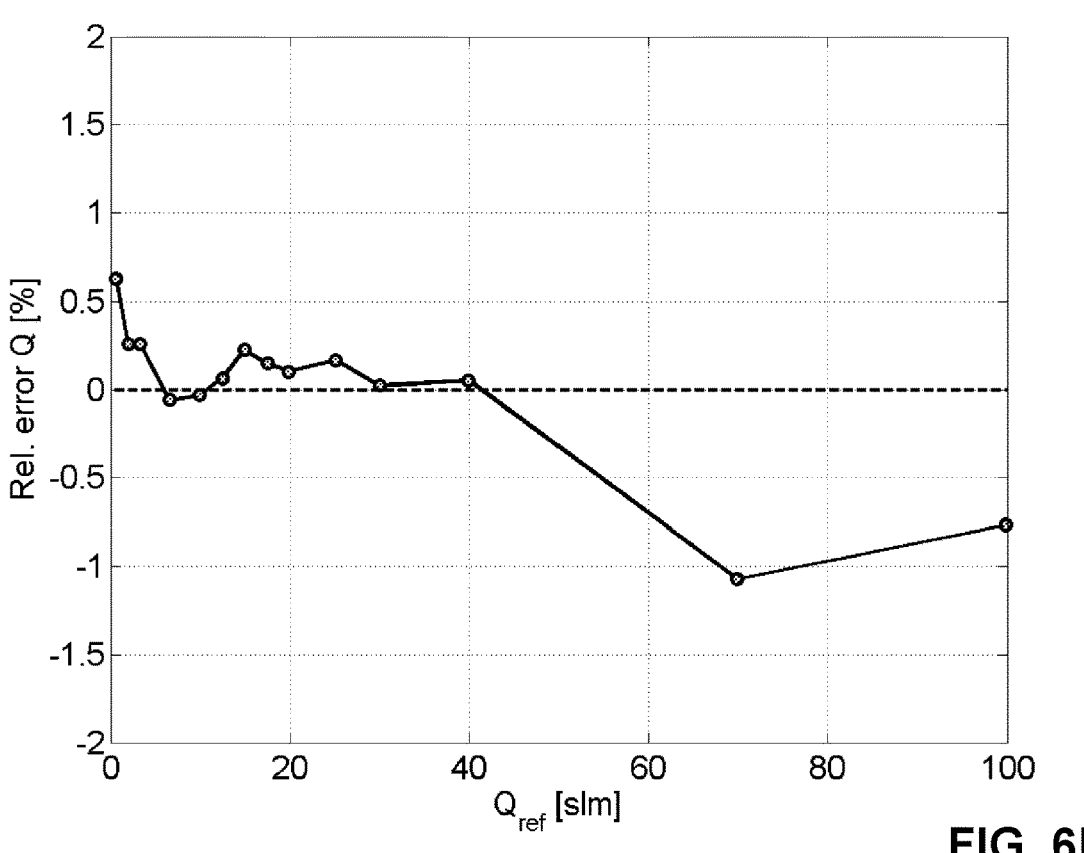
FIG. 6B shows a diagram illustrating the relative error of the corrected flow rate signal of the same flow rate sensor in the mixture of 77% $CH_4$ and 23% $H_2$, using the reference correction function of Eq. (2)

To illustrate this problem, FIG. 6A shows the relative error of the raw flow rate signal $Q_{sensor}$ of the same sensor as in FIGS. 5A and 5B, but this time for a fluid of interest that is a binary gas mixture of 77% $CH_4$ and 23% $H_2$. FIG. 6B shows the relative error of the corrected flow rate signal $Q_{sensor,corr}$, using the reference correction function δ of Eq. (1), which has been determined using air as a reference fluid. As readily apparent from FIG. 6B, use of the reference correction function δ determined in air results in a relatively large error.

Examples of fluids of interest for which the dependency of the relative error on the gas properties is particularly pronounced are:

(i) binary mixtures of methane and molecular hydrogen (ii) binary mixtures of helium and molecular oxygen (heliox)

(iii) binary mixtures of nitrous oxides and molecular oxygen

A brute force solution is to determine a separate reference correction function for each fluid of interest. But this requires a lot of time and gas (or liquid) for the reference measurements and is expensive.

A more subtle solution uses insights from fluid physics to make a single reference function obtained with a single reference fluid useful for a variety of fluids of interest. This will be explained in the following.

As discussed in the introduction, the most important reasons why static flow meters may be sensitive to variations of the flow conditions at the inlet and outlet are:

a) Changes in the flow profile "seen" by the flow sensor. (Intuitively, for a thermal mass flow meter, the flow profile seen by the sensor element is defined by the thermal cloud. For an ultrasonic flow meter, the seen profile is defined by the trajectory between the transducer and the receiver.)

b) Changes in the division ratio between mainpass and bypass flow in a mainpass-bypass system with flow restrictor. (Even if the flow profile in the bypass is not affected by the inlet/outlet condition, the change in the flow profile of the mainpass may cause a difference in the pressure drop over the flow restrictor and hence lead to a different bypass flow.)

To which extent a potential change in the inlet/outlet conditions affects the flow profile and/or the division ratio depends on the physical properties of the fluid. More specifically, the relevant physical quantity is the kinematic viscosity $$v = \frac{\eta}{\rho},$$ (4)

where $\eta$ is the dynamic viscosity and $\rho$ the density of the fluid. The generalized correction procedure described below accounts for the variations of the kinematic viscosity between different fluids.

In the following, we consider, without loss of generality, the example of a thermal flow rate sensor that outputs standard volume flow, as it is well known in the art. We further assume that the thermal mass flow meter has been factory-calibrated for a plurality of different fluids of interest and is therefore able to output raw flow rate signals for each of these fluids of interest (multi-fluid calibration).

Specifically, we assume that the sensor outputs a raw flow rate signal $Q_{sensor}$ that indicates a media-compensated standard volume flow $$Q_{sensor} = \frac{\rho_j(T, p)}{\rho_j(T_s, p_s)} \dot{V} = \frac{p}{p_s} \frac{T_s}{T} \frac{Z_j(T_s, p_s)}{Z_j(T, p)} \dot{V},$$ (5)

where $\rho_j(T,p)$ is the density of the fluid of interest j at operating conditions defined by the temperature T and the pressure p of the fluid of interest j. $Z_j(T,p)$ is the corresponding compressibility factor and $\dot{V}$ is the volume flow. The standard conditions are defined by a predetermined standard temperature $T_s$ and a predetermined standard pressure $p_s$.

We now define a temperature-dependent, standard-related rescaling factor for fluid j as $$r_j(T) = \frac{\rho_j(T_s, p_s)}{\eta_j(T)} v_{ref}(T_s, p_s),$$ (6)

and a corresponding rescaled flow as $$R_j = r_j(T)Q = \frac{v_{ref}(T_s, p_s)}{v_j(T, p)} \dot{V}$$ (7)

Here, $\eta_j(T)$ is the dynamic viscosity of the fluid of interest at temperature T, $v_j(T,p)$ is the kinematic viscosity of the fluid of interest at temperature T and pressure p, and $v_{ref}(T_s, p_s)$ is the kinematic viscosity of the reference fluid at standard temperature $T_s$ and standard pressure $p_s$. The rescaling factor $r_j(T)$ is normalized such that it is equal to one in the reference fluid at standard temperature:

$$r_{ref}(T_s)=1.$$ (8)

As best apparent from Eq. (6), the standard-related rescaling factor $r_j(T)$ reflects the deviation of the kinematic viscosity of the fluid of interest at the operating conditions from the kinematic viscosity of the reference fluid at standard conditions.

The rescaling factor Eq. (5) only depends on the physical properties of the fluid of interest and of the reference fluid. For a known fluid of interest and known temperature and pressure during operation of the sensor, the rescaling factor can be calculated using for example commercially available software packages such as REFPROP NIST or PPDS NEL.

The flow sensor 1 may be configured to return, in addition to the standard volume flow Q [Eq. (5)], the rescaling factor $r_j(T)$ [Eq. (6)] for the selected fluid of interest. Alternatively, discrete values of the rescaling factor $r_j(T)$ may be calculated and stored in lookup table LUT2 of the correction unit 110.

Step-by-Step Description of the Generalized Flow Rate Correction Procedure

The generalized correction procedure may comprise the following steps:

Step 1 (Recording of a Reference Correction Function and Rescaling Factors)

The first step may comprise measuring the reference correction function $\delta$ (Eq. (2)) using the reference fluid (e.g., air). In addition, also a reference rescaling factor $r_{FA}=r_{ref}$ $(T_{FA})$ for the reference fluid, where $T_{FA}$ is the temperature during the reference measurement, may be recorded. Values of the reference correction function $\delta$ for a series of flow rates may be stored in lookup table LUT1 of memory 113. Also the reference rescaling factor $r_{FA}$ may be stored in the memory 113. Finally, for each fluid of interest, the rescaling factor $r_j(T)$ may be calculated for a series of temperature values T and may be stored in lookup table LUT2 of memory 113.

Step 2 (Defining a Generalized Flow Rate Correction Function)

Now a fluid-specific flow rate correction function $\Delta$ may be defined as follows:

$$\Delta(Q_{sensor}, r_j(T)) = \frac{r_{FA}}{r_j(T)} \delta\left(\frac{r_j(T)}{r_{FA}} Q_{sensor}\right).$$ (9)

11

The ratio $$\frac{r_j(T)}{r_{FA}}$$

is a flow rate rescaling factor that reflects a deviation of the kinematic viscosity of the fluid of interest at the operating temperature T from the kinematic viscosity of the reference fluid at the reference temperature. When the fluid-specific flow rate correction function $\Delta$ is evaluated, the raw flow rate signal $Q_{sensor}$ is rescaled with the flow rate rescaling factor $(r_j(T)/r_{FA})$, and the reference correction function $\delta$ is evaluated for the rescaled flow rate signal. The result is rescaled with the inverse of the flow rate rescaling factor to obtain the desired value of the fluid-specific flow rate correction function $\Delta$.

Step 3 (Application of the Flow Rate Correction Function)

The sensor output during normal operation of the sensor may now be corrected using the fluid-specific flow rate correction function in Eq. (9), evaluated with the rescaling factor $r_j(T)$ valid for the measured fluid:

$$Q_{sensor,corr} = Q_{sensor} + \Delta(Q_{sensor}, r_j(T)) \qquad (10)$$

$$= Q_{sensor} + \frac{r_{FA}}{r_j(T)} \delta\left(\frac{r_j(T)}{r_{FA}} Q_{sensor}\right).$$

Figure 6C:
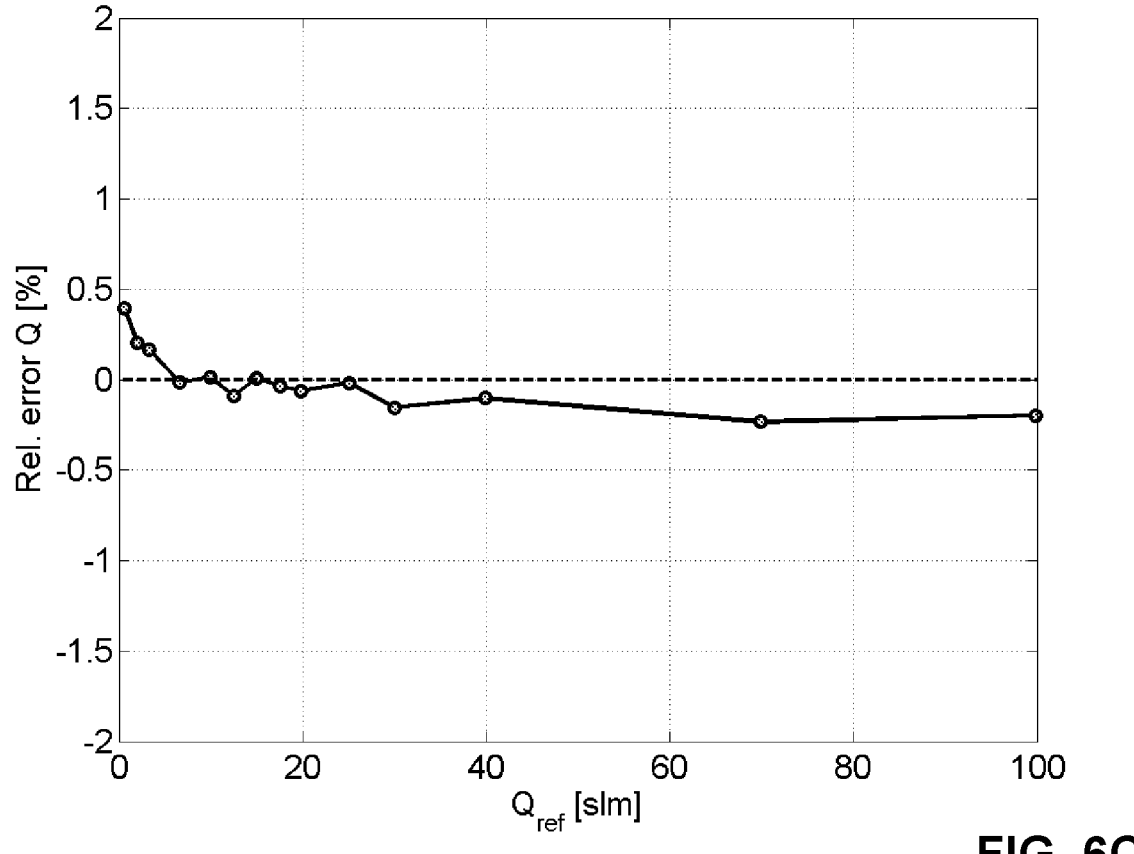
FIG. 6C shows a diagram illustrating the relative error of the corrected flow rate signal of the same flow sensor in the mixture of 77% $CH_4$ and 23% $H_2$, using the flow rate correction function of Eq. (9)

An example for the result of this operation is illustrated in FIG. 6C, which shows the relative error of the corrected flow rate signal of the same flow sensor as in FIGS. 6A and 6B for the mixture of 77% $CH_4$ and 23% $H_2$, using the fluid-specific flow rate correction function of Eq. (9). A comparison of the relative error shown in FIG. 6C with the relative error in FIG. 6B clearly illustrates the superior performance of the generalized flow rate correction procedure.

Further Generalizations

A further generalization of the above-described flow rate correction procedure relates to the case where the composition of the measured fluid of interest is not known. In this case, the auxiliary sensor 2 may be used, which allows one to measure a quantity indicative of the kinematic viscosity of the fluid of interest. The auxiliary sensor 2 may directly measure the kinematic viscosity, e.g., using a Coriolis meter as in Refs. [2-4], or it may measure a different physical property, such as thermal conductivity, speed of sound or thermal diffusivity, which allows one to deduce the rescaling factor given in Eq. (6) using a correlation function valid for the considered fluids.

Flow Charts of Flow Correction Procedure

Figure 7:
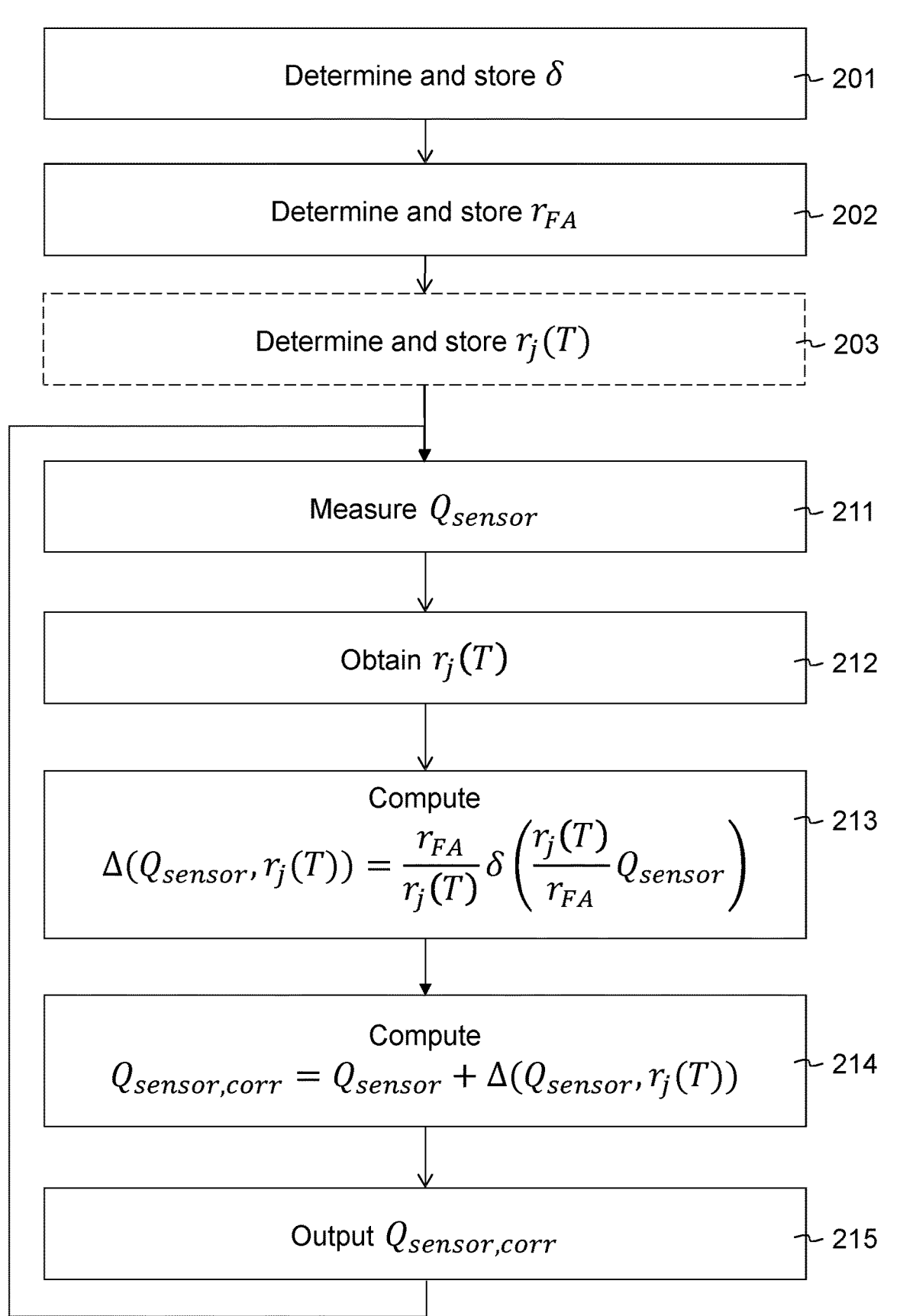
FIG. 7 shows a flow diagram that illustrates a method according to an embodiment of the present invention.

The above-discussed flow correction procedure is summarized in FIG. 7 in the form of a flow chart.

In step 201, discrete values of the reference correction function $\delta$ are determined by a reference measurement with a reference fluid and are stored in lookup table LUT1 of the memory 113 of the correction unit 110. In step 202, the reference rescaling factor $r_{FA}$ is determined and stored in the memory 113. Optionally, in step 203, a series of discrete values of the standard-related rescaling factor $r_j(T)$ for the fluid of interest is calculated for a plurality of temperature values and stored in lookup table LUT2 of the memory 113. These steps are carried out only once.

In step 211, the raw flow rate signal $Q_{sensor}$ is measured using the flow sensor 1.

In step 212, either the temperature T of the fluid of interest is measured, and the standard-related rescaling factor $r_j(T)$ for that temperature is obtained by interpolation between the stored discrete values in LUT2, or the standard-related rescaling factor $r_j(T)$ is determined through a measurement using the auxiliary sensor 2.

In step 213, the generalized flow rate correction function $\Delta$ is evaluated for the raw flow rate signal $Q_{sensor}$ and the standard-related rescaling factor $r_j(T)$.

In step 214, the corrected flow rate signal $Q_{sensor,corr}$ is computed by adding the value of the generalized flow rate correction function $\Delta$ that has been determined in step 213 to the raw flow rate signal $Q_{sensor}$.

In step 215, the corrected flow rate signal $Q_{sensor,corr}$ is outputted.

Modifications

While advantageous embodiments of the invention have been described above, the present invention is not limited to these embodiments, and various modifications are possible without leaving the scope of the invention.

Specifically, the invention is not limited to a specific type of flow rate sensor. Instead of a thermal mass flow sensor, any other type of static flow rate sensor may be used, e.g., an ultrasonic Doppler flow meter or a Coriolis-type flow meter.

The proposed flow rate correction procedure is not limited to be applied to raw flow rate signals that indicate standard volume flow. The procedure can readily be adapted to different types of flow output, including volume flow, mass flow or flow velocity. If required, the pressure p may be taken into account when the flow rate correction function is evaluated. More specifically, independently of the type of flow output, the definition of the flow rate rescaling factor may be guided by the goal that the rescaled flow rate signal should be proportional to the Reynolds number or to the ratio $v/v_j$ of flow velocity v and kinematic viscosity $v_j$ of the fluid of interest.

In particular, if the sensor outputs a mass flow rate, i.e., $$Q_{sensor} = \rho_j(T,p)\dot{V}.$$

we may define the standard-related rescaling factor for fluid j as $$r_j(T) = \frac{\eta_{ref}(T_s)}{\eta_j(T)}.$$

The pressure does not enter the standard-related rescaling factor.

If the sensor outputs a volume flow rate, i.e., $$Q_{sensor} = \dot{V},$$

we may define the standard-related rescaling factor for fluid j as $$r_j(T, p) = \frac{v_{ref}(T_s, p_s)}{v_j(T, p)}.$$

The pressure enters the rescaling function via the kinematic viscosity of fluid j. If the laws of the ideal gas apply for the considered fluids at the considered conditions, the standard-related rescaling factor may be obtained as

13

$$r_j(T, p) = \frac{v_{ref}(T_s, p_s)}{v_j(T, p_s)} \frac{p}{p_s}.$$

If the sensor outputs a flow velocity, i.e., $$Q_{sensor} = \bar{v} = \frac{1}{A} \dot{V},$$

where A is the cross-section area of the flow channel, the same rescaling as for the case "volume flow" can be used.

The electronic circuitry for carrying out the flow rate correction procedure does not need to be a separate correction unit 110 that is separate from the flow sensor 1. In other embodiments, the flow rate correction procedure may be carried out by the control circuitry that is integrated into the flow sensor itself, i.e., the control circuitry of the flow sensor may at the same time also act as the electronic circuitry for carrying out the flow rate correction procedure. This may be realized by providing the control circuitry of the flow sensor with appropriate firmware.

REFERENCES

[1] J. H. Spurk and N. Aksel, «Strömungslehre», Springer Verlag, 2007
[2] N. Najafi, R. Smith, M. Putty, "Coriolis MEMS-sensing technology for real-time fluidic measurements", Flow Control, May 2017
[3] US2005022611A1
[4] U.S. Pat. No. 6,513,393B1

The invention claimed is:

1. A method of determining a flow rate of a flow of a fluid of interest in a fluidic system, the method comprising the steps of:
    determining a raw flow rate signal for the flow of the fluid of interest in the fluidic system, using a flow rate sensor that is integrated into the fluidic system;
    correcting the raw flow rate signal using a flow rate correction function to obtain a corrected flow rate signal, the flow rate correction function compensating for a flow rate signal error that is caused by integration of the flow rate sensor into the fluidic system, the flow rate correction function being based on a reference correction function that is indicative of a flow rate signal error for a flow of a reference fluid due to said integration; and
    outputting the corrected flow rate signal,
    wherein correcting the raw flow rate signal comprises:
    applying a rescaling operation to the raw flow rate signal, using a flow rate rescaling factor that reflects a deviation of a kinematic viscosity of the fluid of interest from a kinematic viscosity of the reference fluid, to obtain a rescaled flow rate signal;
    evaluating the reference correction function for the rescaled flow rate signal;
    applying an inverse rescaling operation to the result of said evaluation to obtain a value of the flow rate correction function; and
    correcting the raw flow rate signal using the thus-obtained value of the flow rate correction function.

2. The method of claim 1, wherein the rescaling operation is applied by multiplying the flow rate rescaling factor with the raw flow rate signal, and wherein the inverse rescaling operation is applied by multiplying the result of the evaluation with the inverse rescaling factor.

3. The method of claim 1,
    wherein the flow rate rescaling factor depends on a temperature and/or pressure of the fluid of interest, and
    wherein the method comprises:
    measuring the temperature and/or pressure of the fluid of interest, and
    determining the flow rate rescaling factor, taking the measured temperature and/or pressure of the fluid of interest into account.

4. The method of claim 1,
    wherein determining the flow rate rescaling factor comprises measuring a quantity that correlates with the kinematic viscosity of the fluid of interest, using an auxiliary sensor, and
    wherein the flow rate rescaling factor is determined based on the measured quantity.

5. The method of claim 4, wherein the measured quantity is directly indicative of the kinematic viscosity of the fluid of interest.

6. The method of claim 4,
    wherein the measured quantity is not directly indicative of the kinematic viscosity of the fluid of interest, and
    wherein the flow rate rescaling factor is determined based on the measured quantity using a correlation function.

7. The method of claim 6, wherein the measured quantity is indicative of thermal conductivity, thermal diffusivity or speed of sound of the fluid of interest.

8. The method of claim 4, wherein the auxiliary sensor is a Coriolis flow meter.

9. The method of claim 1, further comprising a reference measurement for determining the reference correction function, the reference measurement comprising:
    measuring raw flow rate signals for a flow of the reference fluid at a plurality of known flow rates; and
    for each of the measured raw flow rate signals, determining a difference of the associated known flow rate and the measured raw flow rate signal to obtain a value of the reference correction function for said raw flow rate signal.

10. The method of claim 9,
    wherein during the reference measurement, the reference fluid has reference conditions that are different from predetermined standard conditions,
    wherein the method comprises determining a reference rescaling factor that reflects a deviation of the kinematic viscosity of the reference fluid at the reference conditions from the kinematic viscosity of the reference fluid at the predetermined standard conditions, and
    wherein the flow rate rescaling factor is calculated as a ratio of a standard-related rescaling factor and the reference rescaling factor, the standard-related rescaling factor reflecting a deviation of the kinematic viscosity of the fluid of interest from the kinematic viscosity of the reference fluid at the standard conditions.

11. A flow measurement device for determining a flow rate of a flow of a fluid of interest in a fluidic system, the flow measurement device comprising:
    a flow rate sensor that is integrated into the fluidic system, the flow rate sensor being configured to determine a raw flow rate signal for the flow of the fluid of interest in the fluidic system; and
    electronic circuitry configured to carry out the steps of:
    correcting the raw flow rate signal using a flow rate correction function to obtain a corrected flow rate signal, the flow rate correction function compensating for a flow rate signal error that is caused by integration of the flow rate sensor into the fluidic system, the flow rate correction function being based on a reference correction function that is indicative of a flow rate signal error for a flow of a reference fluid due to said integration; and outputting the corrected flow rate signal, wherein the electronic circuitry is configured to correct the raw flow rate signal by:

applying a rescaling operation to the raw flow rate signal, using a flow rate rescaling factor that reflects a deviation of a kinematic viscosity of the fluid of interest from a kinematic viscosity of the reference fluid, to obtain a rescaled flow rate signal;

evaluating the reference correction function for the rescaled flow rate signal;

applying an inverse rescaling operation to the result of said evaluation to obtain a value of the flow rate correction function; and correcting the raw flow rate signal using the thus-obtained value of the flow rate correction function.

12. The flow measurement device of claim 11, wherein the electronic circuitry comprises a memory device that stores a plurality of discrete values of the reference correction function, and wherein the electronic circuitry is configured to retrieve selected values of the reference correction function from the memory device.

13. The flow measurement device of claim 12, wherein the electronic circuitry is configured to interpolate between the selected values when the electronic circuitry evaluates the flow rate correction function.

14. The flow measurement device of claim 11, wherein the electronic circuitry is configured to apply the rescaling operation by multiplying the flow rate rescaling factor with the raw flow rate signal and to apply the inverse rescaling operation by multiplying the result of the evaluation with the inverse rescaling factor.

15. The flow measurement device of claim 11, comprising a temperature sensor and/or a pressure sensor for measuring a temperature and/or pressure of the fluid of interest, wherein the electronic circuitry is configured to determine the flow rate rescaling factor, taking the measured temperature and/or pressure of the fluid of interest into account.

16. The flow measurement device of claim 11, further comprising an auxiliary sensor for measuring a quantity that correlates with the kinematic viscosity of the fluid of interest, wherein the electronic circuitry is configured to base determination of the flow rate rescaling factor on the measured quantity.

17. The flow measurement device of claim 16, wherein the auxiliary sensor is a Coriolis flow meter.

18. The flow measurement device of claim 16, wherein the auxiliary sensor is configured to measure thermal conductivity, thermal diffusivity or speed of sound of the fluid of interest, and wherein the electronic circuitry is configured to determine the flow rate rescaling factor based on the measured quantity using a correlation function.

* * * * *